(12) United States Patent
Bernard et al.

(10) Patent No.: US 11,333,776 B2
(45) Date of Patent: May 17, 2022

(54) SYSTEM FOR CHARACTERIZING A BEAM OF CHARGED PARTICLES AND MACHINE FOR PRODUCING A BEAM OF CHARGED PARTICLES COMPRISING SUCH A SYSTEM

(71) Applicants: ECOLE POLYTECHNIQUE, Palaiseau (FR); CENTRE NATIONAL DE LA RECHERCHE SCIENTIFIQUE, Paris (FR)

(72) Inventors: Denis Bernard, Bonnelles (FR); Bruno Boyer, Palaiseau (FR); Pascal Manigot, Roinville (FR); Christophe Thiebaux, Boissy-sous-Saint-Yon (FR); Marc Verderi, Chartres (FR)

(73) Assignees: ECOLE POLYTECHNIQUE, Palaiseau (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 16/966,967

(22) PCT Filed: Feb. 5, 2019

(86) PCT No.: PCT/EP2019/052721
§ 371 (c)(1),
(2) Date: Aug. 3, 2020

(87) PCT Pub. No.: WO2019/154785
PCT Pub. Date: Aug. 15, 2019

(65) Prior Publication Data
US 2020/0393578 A1  Dec. 17, 2020

(30) Foreign Application Priority Data

Feb. 6, 2018 (FR) ........................... 1850979

(51) Int. Cl.
*G01T 1/28* (2006.01)
*G01T 1/29* (2006.01)

(52) U.S. Cl.
CPC .............. *G01T 1/28* (2013.01); *G01T 1/2907* (2013.01); *G01T 1/2921* (2013.01)

(58) Field of Classification Search
CPC ....... G01T 1/28; G01T 1/2907; G01T 1/2921; G01T 1/2928; G01T 1/185; G01T 1/29; G01T 1/2935
See application file for complete search history.

(56) References Cited

U.S. PATENT DOCUMENTS 3,450,879 A    6/1969  Seppi
4,804,848 A *  2/1989  Horiba ................. G01T 1/2921
                                         250/370.01

(Continued)

OTHER PUBLICATIONS

Written Opinion of the International Searching Authority dated Apr. 17, 2019, issued in corresponding International Application No. PCT/EP2019/052721, filed Feb. 5, 2019, 5 pages.

(Continued)

*Primary Examiner* — David P Porta
*Assistant Examiner* — Fani Boosais
(74) *Attorney, Agent, or Firm* — Christensen O'Connor Johnson Kindness PLLC

(57) ABSTRACT

A system for characterising a beam of charged particles. The system includes a stack comprising an ultra-thin pattern formed from an electrically conductive material; a thin substrate bearing the pattern. The stack forms an emitting electrode able to emit secondary electrons in proximity to a surface of the pattern when the emitting electrode is passed through by the beam of charged particles.

19 Claims, 12 Drawing Sheets

(56) References Cited

U.S. PATENT DOCUMENTS

| | | | |
|---|---|---|---|
| 7,515,681 B2 | 4/2009 | Ebstein | |
| 9,529,099 B2* | 12/2016 | Friedman | H01J 47/002 |
| 2006/0049362 A1* | 3/2006 | Friedman | C22C 19/05 |
| | | | 250/374 |
| 2014/0265823 A1 | 9/2014 | Boisseau et al. | |

OTHER PUBLICATIONS

International Preliminary Report on Patentability dated Aug. 11, 2020, issued in corresponding International Application No. PCT/EP2019/052721, filed Feb. 5, 2019, 1 page.

Badano, H.P., et al., "Laboratory and in-beam tests of a novel real-time beam monitor for hadrontherapy," IEEE Transactions on Nuclear Science 52(4):830-833, Aug. 2005.

Garnir, S., et al., "Secondary electron emission from thin foils under fast ion bombardment," Nuclear Instruments and Methods In Physics Research 202(1):187-192, Nov. 1982.

Shapira, D., et al., "A fast and accurate position-sensitive timing detector based on secondary electron emission," Nuclear Instruments and Methods in Physics Research 454(2-3):409-420, Nov. 2000.

Vignet, J.L., et al., "A new low intensity beam profiler for SPIRAL2," 2nd International Beam Instrumentation Conference (IBIC2013), Oxford, UK, Sep. 2013, 3 pages.

International Search Report dated Apr. 17, 2019, issued in corresponding International Application No. PCT/EP2019/052721, filed Feb. 5, 2019, 2 pages.

Badano, L., et al., "Laboratory and In-Beam Tests of a Novel Real-Time Beam Monitor for Hadrontherapy," IEEE Transactions on Nuclear Science 52(4):830-833, Aug. 2005, Abstract.

Kopp, S., et al., "Beam Test of a Segmented Foil SEM Grid," arxiv.org, Cornell University Library, Jul. 2005, 17 pages.

\* cited by examiner

Ekin (MeV/u)

Ekin (MeV/u)

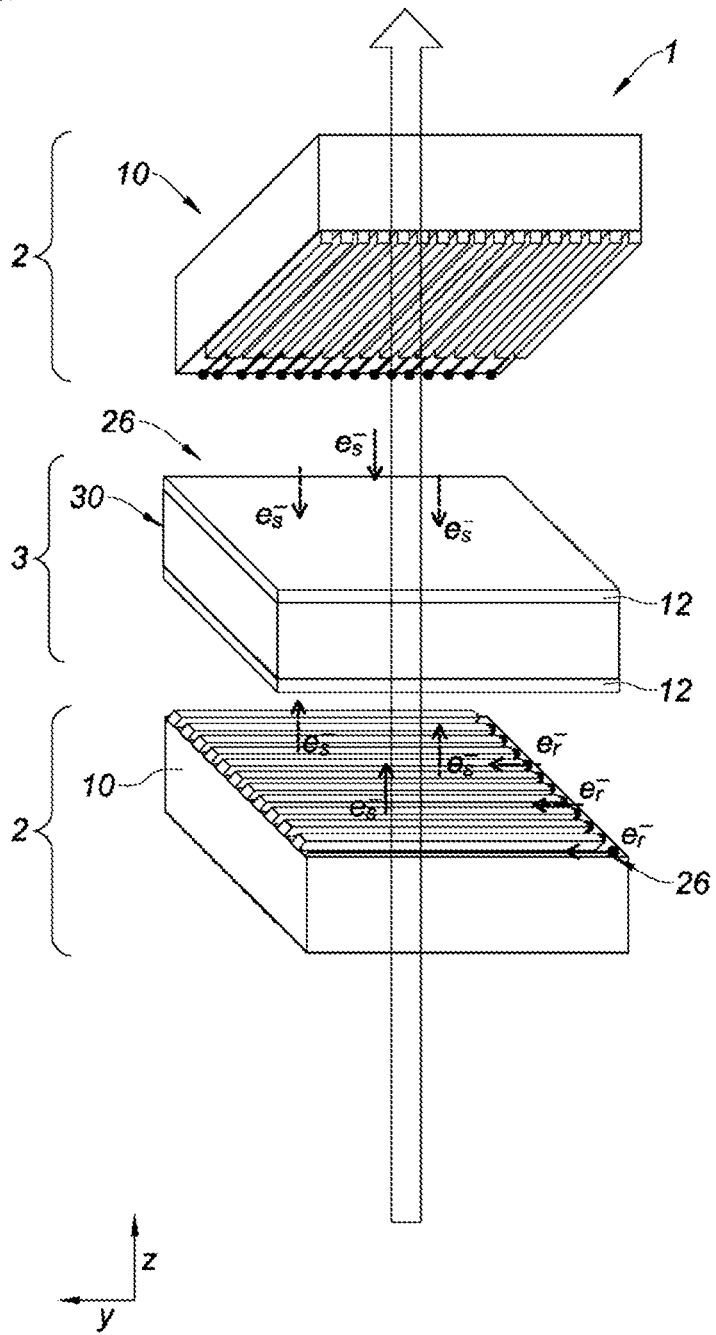

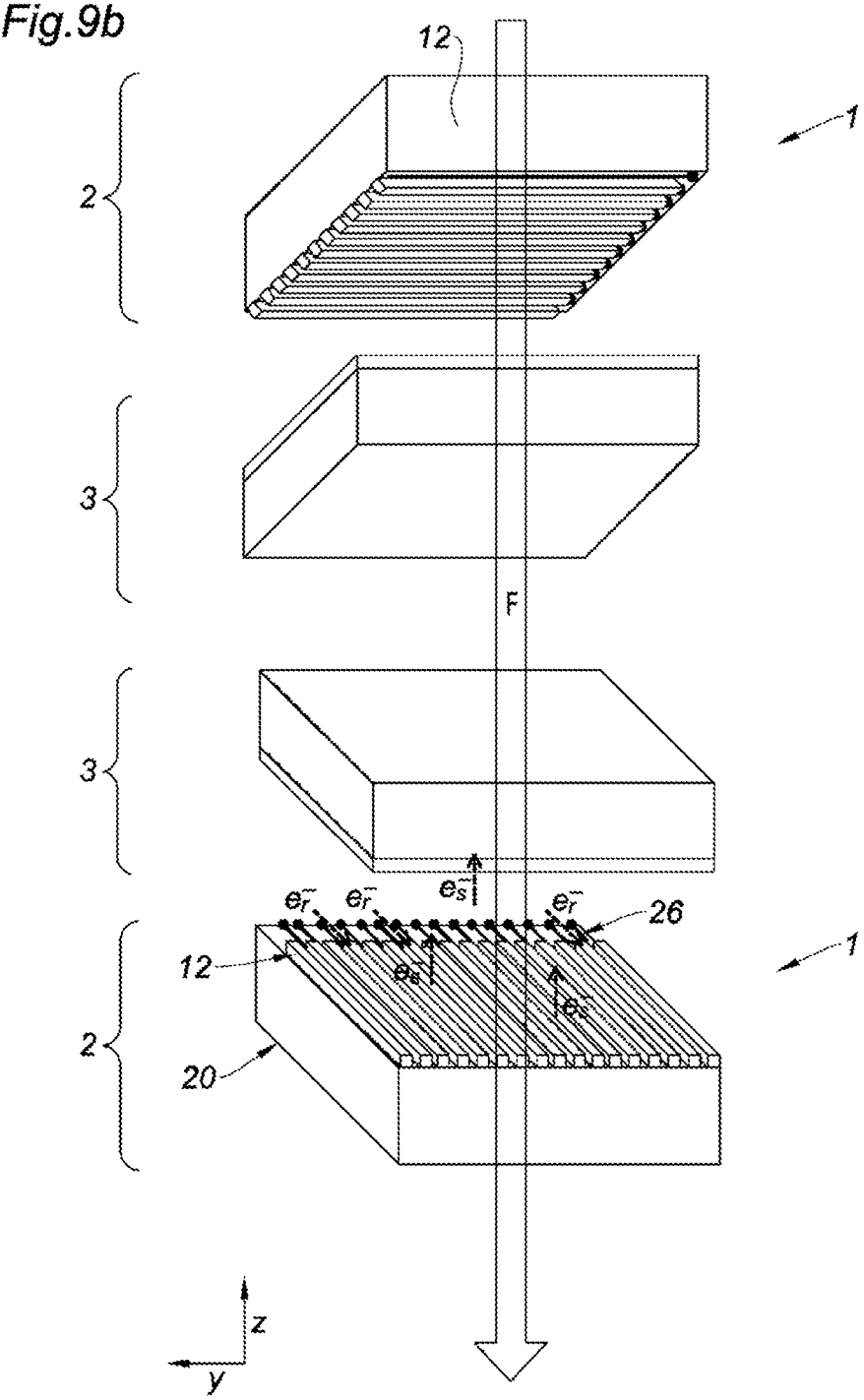

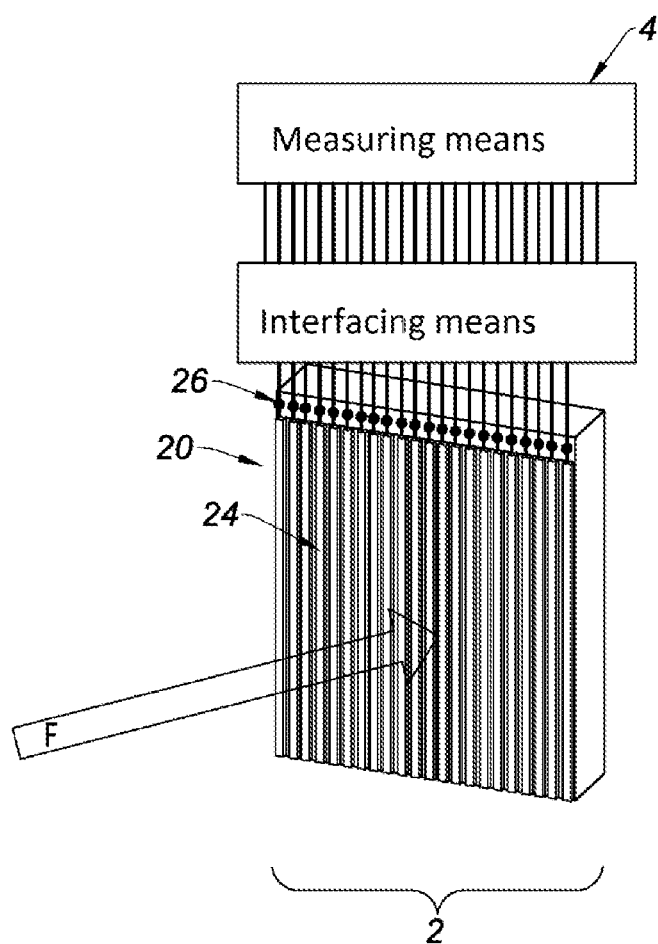

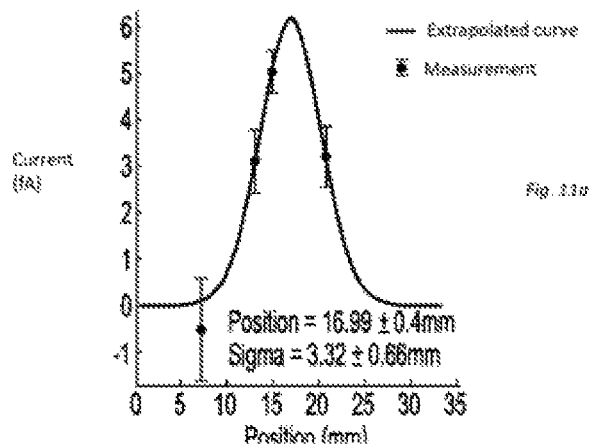
*Fig.11b*
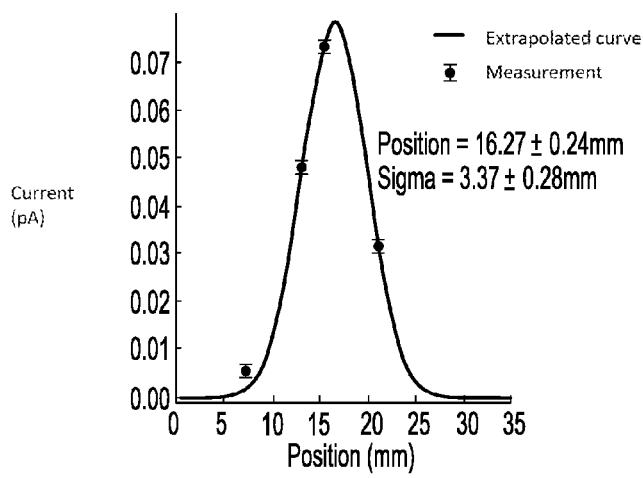
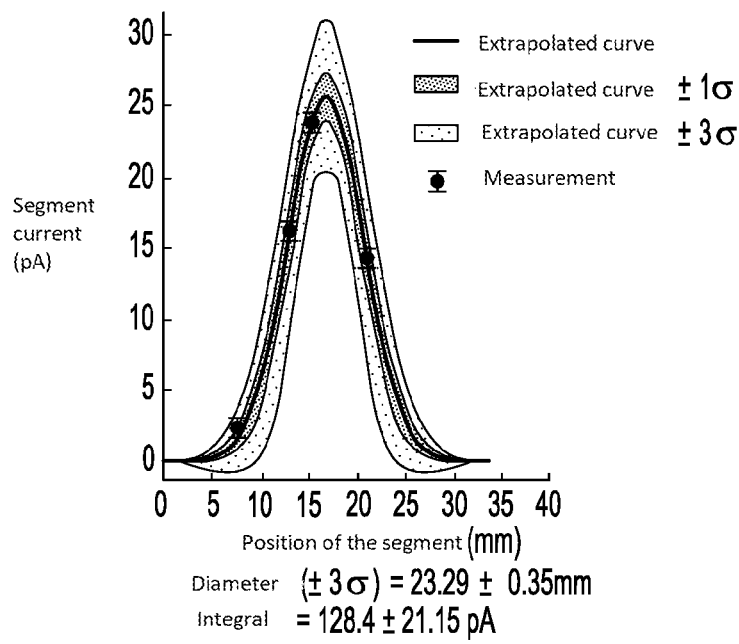
*Fig.11c*

SYSTEM FOR CHARACTERIZING A BEAM OF CHARGED PARTICLES AND MACHINE FOR PRODUCING A BEAM OF CHARGED PARTICLES COMPRISING SUCH A SYSTEM

FIELD OF THE INVENTION

The invention relates to a system for characterising a beam of charged particles, and a machine for producing a beam of charged particles comprising such a system. It is, in particular, intended for measuring the position, the profile and/or the intensity of beams of charged particles in the vacuum, the particles having, for example, a kinetic energy from a few mega-electron-volts to several tens of giga-electron-volts and the beam having an intensity of the order of one hundred femto-amps up to one micro-amp.

The invention has its main application in the field of health, in particular in equipment for treating cancerous tumours by measuring and guiding beams of therapeutic ions. It can also be used on beam lines of charged particles of equipment for producing radiopharmaceutical isotopes or also items of equipment of lines such as used in academic research in the nuclear field or irradiation in the biology field.

STATE OF THE ART

Treating cancerous tumours call upon therapeutic methods such as hadron therapy, or more specifically proton therapy, based on the irradiation of cancerous cells by means of a beam of charged particles, respectively ions and protons. Thanks to their electrical charge, these particles are capable of acquiring a kinetic energy by application of an electrical field and to be guided in beams. Treating cancerous tumours by hadron therapy and proton therapy typically requires particles having kinetic energies between 50 MeV per nucleon and 900 MeV per nucleon for ions and between 70 MeV and 250 MeV for protons. This energy range is commonly termed therapeutic energy range.

Moreover, a well-known advantage of these methods, compared to other conventional radiotherapy treatments, is the possibility of improving the irradiation of cancerous cells by avoiding degrading healthy tissues and organs situated in the proximity of the zone to be treated.

Monitoring the beam requires measurement of the properties of the beam, in particular its intensity, its position and its profile. This measurement is conventionally taken by means of a monitor installed in the proximity or within the machine being used to carry out the therapeutic treatment.

By passing through the monitor, the beam undergoes an angular dispersion, i.e. a deviation with respect to its initial trajectory, having the consequence of modifying the lateral deviation of the beam at a given distance from the monitor. In the case of a treatment operating by scanning the tumour (Pencil Beam Scanning), the angular dispersion must be sufficiently low in order to limit the beam to a sub-millimetric lateral deviation at the level of the patient and to be tolerable. Thus, if the monitor is situated a few metres upstream from the patient, this therefore implies that the water equivalent thickness (WET) of it must not exceed 15 micrometres, the measurement in water equivalent micrometres being a measurement of the depth of interaction of a beam of charged particles with a medium, for example a material.

For a particle of electric charge z and of movement quantity p (in MeV/c) passing through a thickness x of material (in cm), the angular dispersion (in terms of quadratic mean, i.e. Root Mean Square (RMS)) $\theta_0$ (in radians) is approximately given by:

$$\theta_0 \simeq \frac{13.6 \text{ MeV}}{\beta \cdot c \cdot p} z \sqrt{\frac{x}{x_0}} \qquad (1)$$

where $X_0$ is the radiation length of the medium passed through, in cm, $\beta$ the speed of the particle with respect to c, the speed of the light. In the case of proton therapy and hadron therapy, the particles being in a somewhat relativist regime, the dispersion is written as follows:

$$\theta_0 \simeq K \frac{\sqrt{x}}{E_{kin}} \qquad (2)$$

where $E_{kin}$ is the kinetic energy of the particle and $$K = \frac{13.6 \text{ MeV}}{2\sqrt{X_\theta}} z$$

a constant absorbing the other parameters. It is thus seen that to comply with the same dispersion $\theta_0$ passing from a given kinetic energy to a kinetic energy 10 times lower, $E_{kin} \rightarrow E_{kin}/10$, it is necessary to have a thickness×100 times lower, i.e. $x \rightarrow x/100$, by the fact that $$K \frac{\sqrt{x/100}}{E_{kin}/10} = K \frac{\sqrt{x}/10}{E_{kin}/10} = \theta_0.$$

These qualitative angular criteria are represented more specifically in the FIGS. 1c to 4c, based on a numerical simulation.

In relation to the equations (1) and (2) above, and as illustrated in FIG. 1a, with a constant energy beam, the smaller the thickness of material passed through and the smaller the dispersion of the beam therefore the higher the fraction of energy transmitted. For example, so that the lateral deviation limitation from 1 mm at 2 m from the monitor (here termed proton therapy type) is respected, it is necessary that the thickness of material passed through by a beam of protons at 10 MeV is less than 1 μm WET. However, for a beam of protons of 250 MeV, the thickness of the monitor must not exceed 100 μm WET.

Moreover, FIGS. 1b and 1c show that the energy losses of a beam of protons are represented according to the thickness of material passed through said beam over an energy range between 1 keV and 10 GeV and for thicknesses of 0.1 μm WET, 1 μm WET, 10 μm WET and 100 μm WET. At high energies, the fraction of energy transmitted is equal to 1, i.e. the beam of protons is hardly disrupted by the thicknesses of material passed through and decreases with the energy of the beam. Moreover, the greater the thickness of material passed through is low and the greater the decrease of the fraction of energy transmitted occurs at the lowest energies.

Analysing FIGS. 2a, 3a and 4a, shows that the lateral deviation limitation of proton therapy type can only be respected for monitors of which the thickness does not exceed 0.1 μm WET for a beam of electrons at 10 MeV or about 3 μm WET for a beam of alpha particles or $^{12}$C ions to 10 MeV/u. Moreover, FIGS. 2b, 2c, 3b, 3c, 4b and 4c show the energy losses of a beam of electrons, of alpha particles and $^{12}C$ ions according to the thickness of material passed through by said beam over an energy range between 1 keV and 10 GeV (electrons) and 1 keV/u and 10 GeV/u (alphas and $^{12}C$ ions) and for the thicknesses mentioned above. Similarly, to what has been observed for a beam of protons, the fraction of energy transmitted after such beams have passed through the monitor is more and more affected as the thickness of material passed through increases and that the energy of the incident beam decreases.

So that the lateral deviation requirement is respected, it has been demonstrated by the applicant that it is necessary that the system for characterising the beam of particles intercepting the beam, to be of micrometric thickness, for example less than 15 μm WET. For all that, this requirement is not limited to the simple use of these monitors in hadron therapy or proton therapy, and this is a qualitative evaluation criterion for the monitoring of beams of charged particles which can be used for other applications.

The main solutions currently being developed in the industry for characterising beams of charged particles consist of ionisation chambers. Document US 2014/0265823 describes such ionisation chambers. They typically consist of two electrodes facing one another, separated from one another by a gas volume. The ionisation chamber is placed in the vacuum of the line and for the passage of the beam of particles, ions are generated by impact of molecules of the gas with the particles, by releasing electrons. The ejected electrons are thus collected by a cathode, which generates a measurable signal and to determine the intensity and the form of the beam of particles.

Regardless of their performance in terms of dispersion of the beam, the ionisation chambers have numerous disadvantages. Indeed, the gas pressure must be adapted to the range of intensity of the beam, in particular because of space charge phenomena. In addition, they require additional means situated within the device, for example sensors, to control environmental parameters (temperature, pressure, humidity) which intrinsically limits the miniaturisation of these chambers and affects the operations carried out by means of said chambers. In addition, to ensure good resistance to radiation, they must be replaced frequently. Indeed, the radiation causes a deterioration of the walls, and in particular their mechanical strength properties, altering their resistance to the pressure exerted by the gas and subsequently leaks. Moreover, for the beams of particles with increased current densities, means for correcting the signal are also necessary. Indeed, by passing through the gas, such a beam causes the recombination of electron-hole pairs and generates a large number of electron-hole pairs which disrupts the signal, leading to an error in measuring the intensity and the form of the beam if the signal is not corrected.

Other alternative solutions have also been developed to monitor the beams of particles.

Document U.S. Pat. No. 7,515,681 B2 describes a system based on the use of a screen based on a scintillating material situated between the source of the beam of particles and the zone to be irradiated. In response to a beam of protons, the material converts the energy deposited on the visible light screen. This light is thus transferred by means of optical devices (e.g. lenses, mirrors, etc.), which potentially generate disturbances to the signal, up to one or more imaging sensors making it possible to instantaneously provide the position and the profile of the beam. In such a system, the size of the photosensitive sensor must be as large as possible in order to counterbalance the shrinkage factor required to project the image of the screen on the imaging sensor(s), which makes it particularly bulky. In addition, measuring artefacts can appear when the distance separating the sensors from the screen is not precisely adjusted, involving the use of complex optical means. Moreover, the thickness of the system is not indicated, outside that of the substrate which is 100 μm in an exemplary embodiment.

Shapira et al. (Nuclear Instrument and Methods in Physics Research, vol. 454, p. 409-420, 200) propose an offset imaging system for hadron therapy based on the emission of secondary electrons. In this system, a sheet inclined at 45° or 30° with respect to the axis of propagation of the beam of particles is passed through by this beam, generating ion impacts at the origin of the mechanism for emitting secondary electrons at the surface of the sheet. The electrons ejected from the sheet are then subjected to a first pulse coming from an electric field in order to point in the direction of an imaging detector, then, to a second pulse coming from a more moderate electric field so as to be accelerated towards said detector. The detector thus multiplies the number of incident electrons and, in combination with a scintillant screen, the signal detected and processed in order to be imaged in the form of a 2D electron pattern. A mask is also placed in the proximity of the detector in order to minimise the dispersion of the electrons emitted from the sheet. The system is therefore relatively complex. In addition, the resolution of the pattern obtained is limited to that of the detector (<0.25 mm). The system can be used at low intensity as at high intensity, however at high intensity, if the threshold counting rate of the detector is reached, the pattern obtained can be significantly degraded. In addition, this system is very sensitive to the electromagnetic environment induced by the elements of the machine producing the beam to be measured.

Vignet et al. (Proceedings of IBIC2013, Oxford, UK, ISBN: 978-3-95450-127-4) propose metal wire monitors. These monitors are also based on the emission of secondary electrons during the passage of a fractional beam of particles on an emitting sheet, for example made of aluminium. In this system, a metal wire network separating the emitting sheet of a detector optimises the energy from the electrons and allows the monitor to operate at high intensities without being damaged. The monitor can operate at low (50 keV) as at medium energy (50 MeV). However, such a monitor cannot be kept in the propagation line of the beam during an irradiation as it blocks the passage of the beams of low energies. In addition, the geometry of the monitor, and in particular the placement of the magnets being used to control the movement of the electrons, considerably impacts the electronic dispersion between the sheet and the detector.

Document U.S. Pat. No. 3,450,879 proposes a detector consisting of a dielectric covered on each of its faces by a metal electrode. The dielectric forms the medium, non-conductive, of emitting electrons from the detector. The metal electrode covering the dielectric, taken in combination with a measuring system, makes it possible to image the place from which the electrons emitted by the dielectric originated. In this, the metal electrode therefore forms a receiving electrode. This detector does not operate according to a principle of emitting secondary electrons.

The document Badano et al., Laboratory and In-Beam Tests of a Novel Real-Time Beam Monitor for Hadron-therapy, IEEE, vol. 52, 4, 2005.08.01 discloses a beam monitor intended to be used in hadron therapy. The monitor consists of a support of 0.1 to 0.3 μm of alumina and a layer of 10 to 20 nm of aluminium on each side of the alumina support. The aluminium layer present on each side of the sheet, guides said secondary electrons emitted by means of electric field lines from the surface of the sheet. Having no pattern, this aluminium layer does not allow, by itself, to image the beam. It is an independent detection device (situated outside of the axis of the beam), which ensures the imaging.

Kopp et al. (Nuclear Instruments Methods in Physics Research Section A: Accelerator, Spectrometers, Detector and Associated Equipment, vol. 554, issue 1-3, p. 138-146, 2005) propose segmented sheet-based monitors adapted to measuring the intensity, the position and the profile of the beams of high intensities and of high energies (e.g. 120 GeV). Five segmented sheets of titanium of 5 µm thickness are mounted on a ceramic comb which has grooves ensuring their alignment and their mechanical strength, which represents a total thickness of material of 25 µm. Such a system is very well suited to the characterisation of beams of particles at high energies (a few GeV), since with this thickness of material, it does not block radiation. However, by using such a monitor with intermediate energies, the beam of particles would be highly disrupted by said monitor, and a permanent installation in the line of propagating the beam is not possible.

Indeed, if the water equivalent figure of the monitor of Kopp et al. from the formula (1) below, the use of such a monitor would induce a dispersion going well beyond the tolerable 15 µm WET. Indeed, for titanium, the radiation length is 3.56 cm, which represents a radiation length of 10 times less than that of water, 36.08 cm. Consequently, a thickness of 5 µm of titanium therefore induces the same dispersion as 50 µm of water. Each sheet having two planes 2 and 4, the passing through of the monitor would induce an equivalent dispersion of 100 µm of water.

The abovementioned alternative solutions have numerous disadvantages. Indeed, the monitors are, by choice, too thick from the standpoint of intermediate energies, too complex in terms of optical and/or electromagnetic installations, permanently unusable in the propagation line of the beam, limiting in terms of use and limited in terms of accessible energy range and/or intensity dynamic.

The challenge is therefore to achieve a profilometry of beams of charged particles which do not degrade the beam, and even for beams of low energy as those considered here.

The invention overcomes the disadvantages of the abovementioned systems proposing a system for characterising a beam of charged particles, the system comprising a stack, said stack comprising:

an ultra-thin pattern formed from an electrically conductive material;
a thin substrate carrying said pattern;
the stack constituted by the substrate and the pattern forming an emitting electrode, said emitting electrode being capable of emitting secondary electrons in the proximity of a surface of said pattern when said emitting electrode is passed through by the beam of charged particles.

By "thin substrate", is meant a substrate having a micrometric or submicrometric thickness, i.e. a substrate which is as thin as possible while being specific to ensuring the mechanical strength of the system. The material budget of the substrate depends on the application aimed for, and can be, for example, less than 15 micrometres water equivalent, in particular for characterising beams of proton therapy.

Moreover, by "ultra-thin pattern", this means a pattern which is as thin as possible, while being specific to ensuring electrical conduction, for example a pattern having a nanometric dimension thickness, i.e. of thickness strictly less than 1 µm.

Thus, thanks to the invention, while contributing to allowing electrical conduction, and therefore to establish the profile of a beam of charged particles, the ultra-thin pattern used in the characterisation system according to the invention contributes to limiting the dispersion of the beam with a sub-millimetric deviation at 2 metres, i.e. that a perfect beam arriving on the system has a width less than 1 mm, to 2 metres.

Furthermore, it makes it possible:
to reduce the disruptions of the beam during its passage into the system, i.e. so that the fraction of energy transmitted after the passage into the characterisation system is, for example, greater than 0.95; and
to minimise overheating caused by the passage of the beam, which allows the invention to operate at intensities greater than the current proton therapy systems.

In addition, as the overall thickness of the system, i.e. of the emitting electrode, remains low, this limits the disruptions of the beam, and ensures a continuous measurement.

It must also be noted that, contrary to the current systems, the characterisation system according to the invention has a simple structure. Indeed, the low lateral deviation, i.e. the low dispersion of the beam at the level of the patient, is conferred by the low thickness of the system itself. It is also this low thickness which improves the precision and the continuity of the measurement during the monitoring of the profile of the beam.

Moreover, thanks to the properties of the stack formed, the characterisation system according to the invention has a good resistance to radiation, and it not subjected to mechanical forces, which allows it to be tolerant to cumulated doses, and to have a longevity greater than that of the current proton therapy systems.

According to different features of the invention which can be taken together or separately:
the emitting electrode extends along a substantially flat distribution, and/or substantially perpendicular to the direction of propagation of the beam;
the system is intended to be situated in the line of the beam to be measured;
said particles have an energy between 10 MeV per nucleon and a few tens of GeV, preferably between 50 and 900 MeV per nucleon for ions, also more preferably between 70 and 250 MeV for protons;
the beam has an intensity between 100 fA and 1 µA;
said stack comprises at least one bonding layer interposed between the pattern and the substrate so as to facilitate the adhesion of said pattern on the substrate;
the substrate is formed from a thermostable material such as a polymer and/or a ceramic and/or MYLAR® and/or PEEK;
the substrate is formed from a polyamide such as CP1® and/or Kapton®;
as a variant, the substrate consists of silicon nitride;
the thickness of the pattern is between 10 nm and 100 nm;
said substrate is electrically insulating;
said pattern is formed from a plurality of conductive segments electrically insulated from one another;
said segments are made of a rustproof material, preferably gold;
said segments are situated side-by-side;
said segments are connected to an electronic means;
said segments are oriented along the same direction, so as to sample the beam along a given axis;

said segments are of the same width and are equidistant;
said segments are cut into angular sectors, so as to measure the non-centring and/or the radial distribution of the beam;
in a variant, said segments are cut into concentric sectors, so as to measure the non-centring and/or the radial distribution of the beam;
in a variant, said segments are cut into angular and concentric sectors so as to carry out an imaging of the beam;
said system comprises a collecting electrode;
said collecting electrode is subjected to a potential greater than the potential of the emitting electrode, so as to collect the secondary electrons emitted by said emitting electrode;
said collecting electrode is situated opposite the emitting electrode;
said collecting electrode is not situated opposite the emitting electrode, but outside of the axis of the beam;
said system comprises several emitting electrodes;
said system comprises several collecting electrodes;
each collecting electrode is dedicated to collecting secondary electrons emitted by one of said emitting electrodes;
in a variant, each collecting electrode is dedicated to collecting secondary electrons emitted by several of said emitting electrodes;
said system is configured such that the secondary electrons emitted by the emitting electrode are collected by the materials surrounding the system;
said system comprises a measuring means;
said measuring means measures the quantity of secondary electrons emitted from the surface of the emitting electrode(s);
said measuring means is electrically connected to the emitting electrode(s).

According to another aspect, the invention also relates to a machine for producing a beam of charged particles comprising a system such as described above. Said system is preferably fixed and permanent in said machine. By this meant that, that it is not retractably mounted, although this variant is possible.

According to another aspect, the invention also relates to the use of a characterisation system such as described above to characterise a beam of charged particles of an item of equipment for treating cancerous tumours, by way of example.

PRESENTATION OF THE FIGURES

Other aims, features and advantages of the invention will appear more clearly in the following description, made in reference to the appended figures, in which:

FIGS. 1a, 1b and 1c illustrate the width of a beam of protons having passed through a monitor at 2 m (FIG. 1a) and the energy loss of the beam (FIGS. 1b, 1c) according to the energy of the beam. The abscissa axis is common to FIGS. 1a, 1b and 1c and represents the kinetic energy of the beam (in MeV/u). In FIG. 1a, the ordinate axis represents the width of a beam of protons having passed through a monitor at 2 m (in millimetres). In FIGS. 1b and 1c, the ordinate axis represents the fraction of energy transmitted. The solid arrows oriented upwards correspond to a monitor having a thickness of 100 µm WET. The solid arrows oriented downwards correspond to a monitor having a thickness of 10 µm WET. The empty arrows oriented upwards correspond to a monitor having a thickness of 1 µm WET. The empty arrows oriented downwards correspond to a monitor having a thickness of 0.1 µm WET;

FIGS. 2a, 2b and 2c illustrate the width of a beam of electrons having passed through a monitor at 2 m (FIG. 2a) and the energy loss of the beam (FIGS. 2b, 2c). The parameters represented on the abscissa axis and the ordinate axis in FIGS. 2a, 2b and 2c are identical to those represented in FIGS. 1a, 1b and 1c. This is the same for the symbols corresponding to the different monitor thicknesses considered;

FIGS. 3a, 3b and 3c illustrate the width of a beam of alpha particles at 2 m (FIG. 3a) and the energy loss of the beam having passed through a monitor (FIGS. 3b, 3c). The parameters represented on the abscissa axis and the ordinate axis in FIGS. 3a, 3b and 3c are identical to those represented in FIGS. 1a, 1b and 1c. This is the same for the symbols corresponding to the different monitor thicknesses considered;

FIGS. 4a, 4b and 4c illustrate the width of a beam of 12C ions having passed through a monitor at 2 m (FIG. 4a) and the energy loss of the beam (FIGS. 4b, 4c). The parameters represented on the abscissa axis and the ordinate axis in FIGS. 4a, 4b, 4c are identical to those represented in FIGS. 1a, 1b and 1c. This is the same for the symbols corresponding to the different monitor thicknesses considered;

FIG. 9a illustrates schematically, in perspective, a characterisation system according to a fourth embodiment of the invention, the system comprises several emitting electrodes;

FIG. 9b illustrates schematically, in perspective, a characterisation system according to a variant of the fourth embodiment of the invention, the system comprises several emitting electrodes and several collecting electrodes;

FIG. 9c illustrates schematically an electrical measuring circuit comprising a characterisation system according to the invention and a measuring means;

FIGS. 11a, 11b and 11c illustrate the evolution of the current measured according to the position of the segments, the protons have an energy of 60 MeV and the intensity of the beam is respectively 200 fA, 1 pA and 1 nA according to the invention

DETAILED DESCRIPTION

Figure 1C:
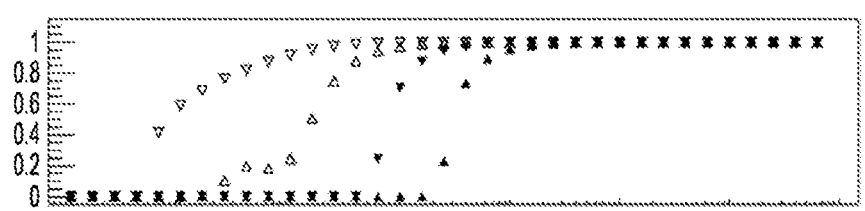
Figure 1B:
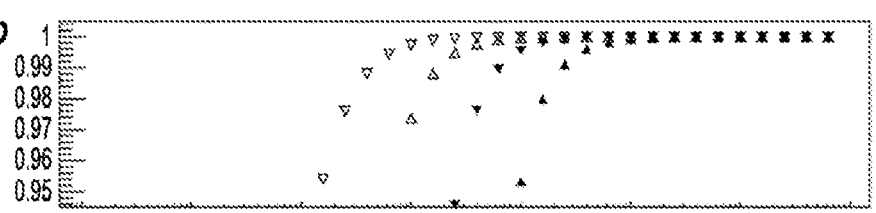
Figure 1A:
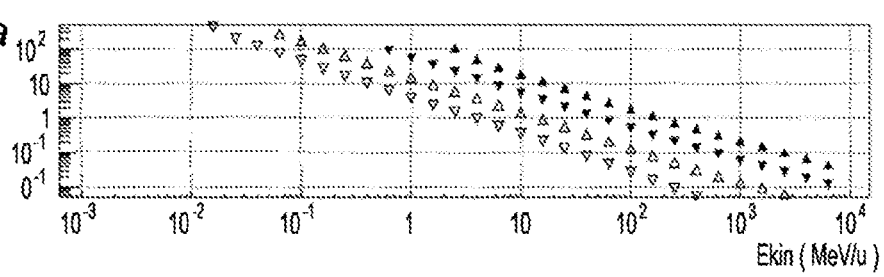
Figure 2C:
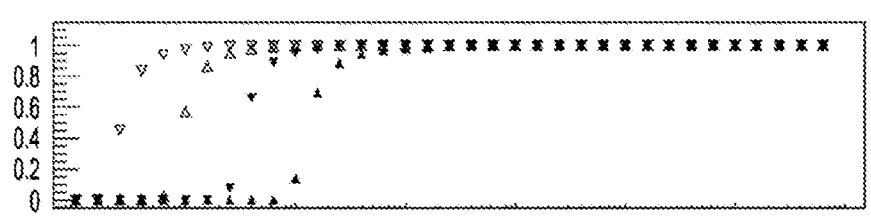
Figure 2B:
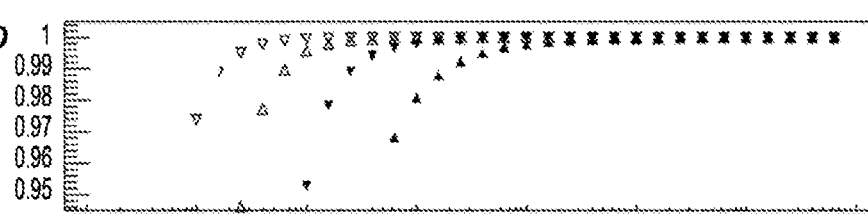
Figure 2A:
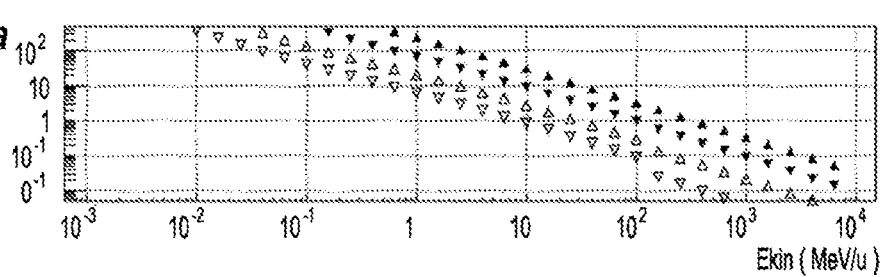
Figure 3C:
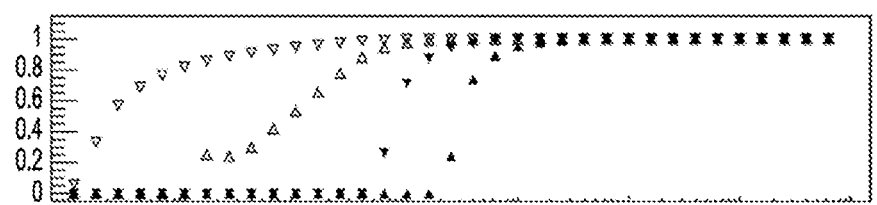
Figure 3B:
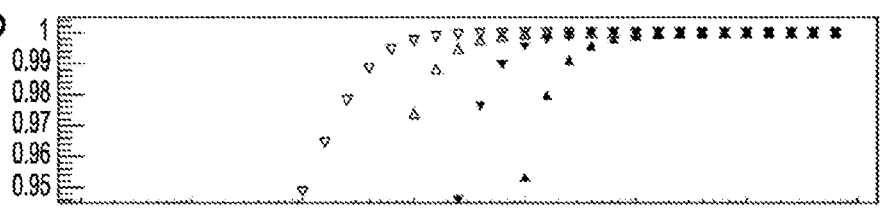
Figure 3A:
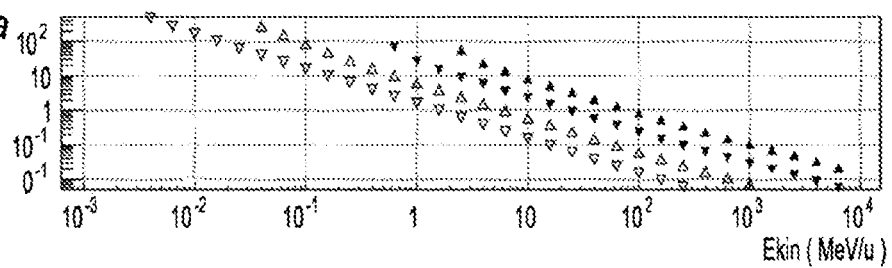
Figure 4C:
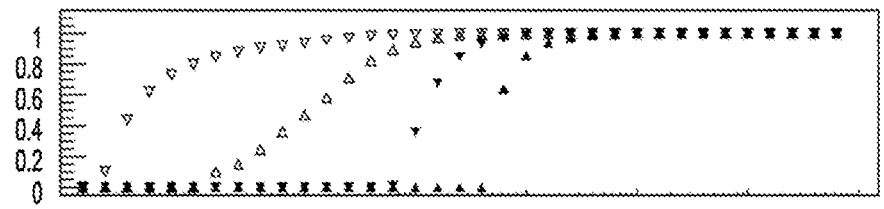
Figure 4B:
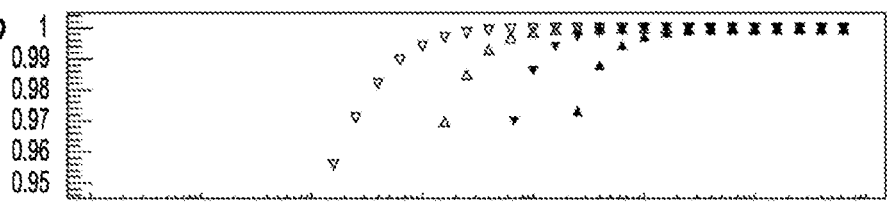
Figure 4A:
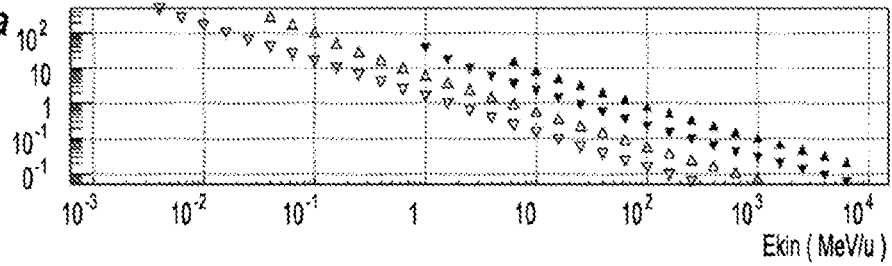
Figure 5A:
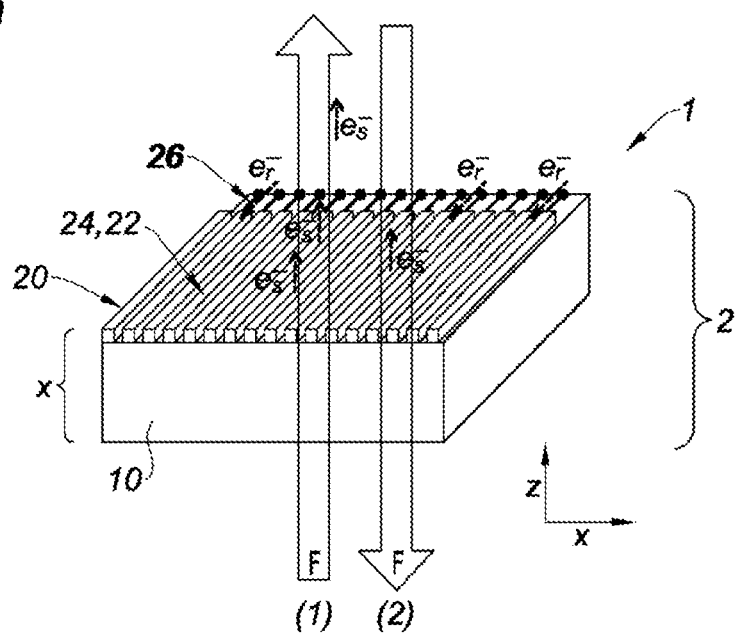
FIGS. 5a, 5b and 5c illustrate schematically, in perspective, a characterisation system according to an embodiment of the invention (5a) and according to variants of the invention (FIGS. 5b and 5c). The arrows F(1) represent an emission forwards and the arrows F(2) represent an emission rearwards.

In reference to FIG. 5a, the invention relates to a system for characterising 1a beam F of charged particles. The system 1 is situated in a line for transporting particles, comprising the beam F to be measured, such that said system is passed through by said beam.

The particles constituting the beam are charged subatomic particles such as protons and/or ions and/or electrons and/or positrons. They are capable of depositing their energy in the medium, for example a material, that they pass through by obtaining one or more electrons from it, and subsequently, by directly ionising atoms of said medium.

For therapeutic purposes, and in particular for treating cancerous tumours by proton therapy and hadron therapy, the particles are preferably protons and/or ions. Other types of charged particles can be used by themselves or in combination with other particles, and the invention is not limited to the example above.

The zone to be irradiated or to be treated can be situated up to a few metres downstream from the characterisation system 1 and an output window of the beam F of particles, i.e. that said zone is situated at the output of the line for transporting particles.

The characterisation system 1 comprises a stack, said stack comprising an ultra-thin pattern 20 formed from an electrically conductive material and a thin substrate 10 carrying said pattern 20. With the pattern 20 being ultra-thin, the substrate 10, in particular by its thickness ensures a mechanical support of said pattern 20.

The stack constituted by the substrate 10 and the pattern 20 forms an emitting electrode 2 extending advantageously according to a substantially flat distribution, and/or substantially perpendicular to the direction of propagation of the beam F which corresponds to the stack direction of the pattern 20 and of the substrate 10. In other words, said emitting electrode 2 has a low dimension, i.e. a low thickness along an axis Z extending in the direction of propagation of the beam F and two other dimensions, along an axis X and an axis Y, adapted to its insertion and its maintenance in the line for transporting particles.

The characterisation system 1 allows the monitoring of beams of particles having a kinetic energy between 10 MeV and several tens of GeV.

Indeed, in reference to FIGS. 1a to 4b, at high energies, i.e. at energies greater than 500 MeV (or 500 MeV/u), the systems having a thickness less than 100 μm WET intercepting the beam F do not lead to much disruption to said beam, i.e. that the fraction of energy transmitted is, for example, greater than or equal to 0.95 after the passage of the beam through system 1. In addition, at these energies and even after its passage through a system of 100 μm WET, the beam F of charged particles undergoes hardly any dispersion, since its width remains less than 1 mm, at 2 m, even less than 0.1 mm, at 2 m, for very high energies (greater than or equal to 1 GeV).

However, at low energies, i.e. at energies less than 50 MeV (or 12.5 MeV/u), the low disruption of the beam (fraction of energy transmitted, for example, greater than or equal to 0.95) and the low dispersion of the beam (width of the beam less than 1 mm, at 2 m) are only reached for systems having very low thicknesses, more specifically 100 μm WET for a beam of electrons, 10 μm WET for a beam of protons, 1 μm WET for a beam of alpha particles or $^{12}C$ ions.

The characterisation system 1 is particularly well-adapted to the beams F of particles having an energy between 50 MeV and 900 MeV per nucleon, termed intermediate energy range. Indeed, the system 1 being of micrometric or sub-micrometric dimension, and in particular of thickness less than 15 μm WET, the requirements of low disruption and of low dispersion of the beam F are respected.

The intermediate energy range thus targets beams F of therapeutic application, i.e. having an energy between 70 MeV and 250 MeV for protons and 50 MeV per nucleon to 900 MeV per nucleon for ions forming, from the characterisation system 1, an invention particularly adapted to this application. Indeed, as the beam F can reach the zone to be treated by having a low dispersion, it thus becomes possible to target said zone with a very precise resolution by avoiding degrading healthy tissues and organs situated in the proximity of said zone. The penetration depth of the beam F can thus be modified in the tumoral zone with a great precision, and therefore without any risk for the patient, by only varying the energy of the beam F.

According to the invention, said emitting electrode 2 is capable of emitting secondary electrons $e_s^-$ in the proximity of a surface 22 of said pattern 20 when said emitting electrode 2 is passed through by the beam of charged particles. The emission of secondary electrons $e_s^-$ being proportional to the number of particles of the beam having passed through the pattern 20, this phenomenon is advantageously linear. Indeed, by passing through the pattern 20, the charged particles of the beam F deposit their energy on the atoms of said pattern 20, such that electrons are obtained at the atoms of the pattern 20 and that said atoms are ionised.

In other words, after having been passed through by the beam of particles F, the atoms situated on the surface 22 of the pattern 20 do not have one or more electrons on their last electron layer and are therefore forced to recover electrons $e_r^-$ in order to recover their stability. With the pattern 20 being formed from an electrically conductive material, the electrons $e_r^-$ can migrate from the electronic device via at least one electronic means 26, then be measured by electronic devices by means of an image of the charge or of the current induced by the passage of the beam F. This image thus constitutes the signal measured by the characterisation system 1.

The emission of secondary electrons involved during the passage of the beam F through the emitting electrode 2 is a phenomenon which only operates over a few nanometres, in particular 10 nm, on the surface of the pattern 20. In other words, it only relates to the 10 nm of thickness starting from the surface 22 of said pattern. While remaining ultra-thin, it is therefore preferable that the pattern 20 has a thickness of at least 10 nm.

At the same time, it is understood that the substrate 10 is only of interest in mechanically supporting the pattern 20 and, that advantageously, the secondary electrons which are emitted from said substrate do not contribute to the measured signal.

Preferably, the pattern 20 has a thickness which is sufficient for ensuring its electrical conductivity. Indeed, according to the deposition technique used and/or the nature of the material used, an ultra-thin layer, i.e. the nanometric dimension, can be presented in the form of "islands" or "aggregates" of materials more or less insulated from one another, due to its low thickness. Thus, in certain regions of its surface, an ultra-thin layer can have a sufficient electrical conductivity, while in other regions, the electrical conductivity is far below what is required.

Thus, it is preferable that the thickness of the pattern 20 is adapted in order to ensure the coalescence of these material islands or aggregates, i.e. a complete coverage of the substrate 10 by the pattern 20, and consequently ensuring that the electrical conductivity of the pattern 20 is not only sufficient, but also uniform over the whole of the surface 22.

A person skilled in the art can adjust the thickness of the pattern 20 according to the deposition technique used and/or the material constituting said pattern. As an example, for a pattern 20 made of gold, a thickness of 30 nm will be sufficient for obtaining a sufficient electrical conductivity for allowing the emission of the secondary electrons $e_s^-$.

The pattern 20 can be made of different materials such as metals, metal alloys, oxidised metals, organic compounds or any other material allowing it to be sufficiently conductive. However, it is preferable that the material forming the pattern 20 is rustproof, as oxidation is a source of contamination which modifies the rate of secondary electrons. Indeed, the contamination of the thin and ultra-thin layers, conductive or semi-conductive, is a current degradation phenomenon during which the surface of the layer will absorb foreign atoms and mainly oxygen atoms.

Advantageously, the pattern 20 can made of gold. Gold is a material with a high atomic number, rustproof and an excellent conductor. It is therefore particularly suitable for ensuring and promoting the process of emitting secondary electrons. Gold can be weakly adherent on the substrates due to its rustproof character and the delamination which results from it, however its general properties, i.e. its conductivity and its atomic number, make it a preferred material.

Figure 5B:
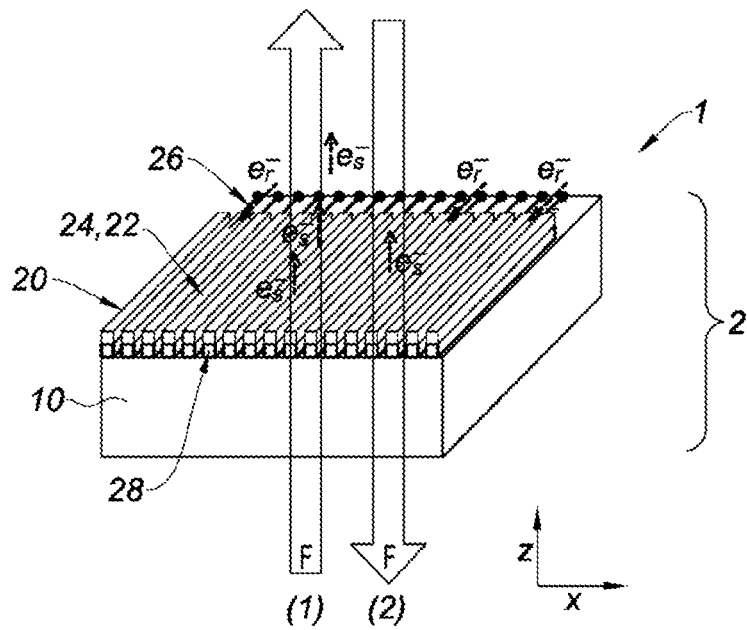

In reference to FIG. 5b, the emitting electrode 2 can advantageously comprise a bonding layer 28 interposed between the pattern 20 and the substrate 10.

Said bonding layer 28 facilitates the adhesion of the pattern 20 on the substrate 10, in particular when the material forming said pattern is not sufficiently adherent. For example, the bonding layer 28 can be made of chromium (Cr) or titanium (Ti). Chromium has an average atomic number, but is oxidisable and is very well-adapted to contain the possible delamination of gold, likewise titanium. The characterisation system 1 can also comprise a plurality of bonding layers 28 having different properties.

Moreover, the micrometric thickness of the substrate 10 means that a beam F of charged particles induces less heating within the characterisation system 1 in comparison with the heating that it would have generated in a thicker system (for example, of thickness greater than 15 μm WET). Indeed, by passing through the characterisation system 1, the charged particles of the beam F interact with a lower thickness of atoms and, therefore have less energy in this system compared with an identical system but having a thicker substrate 10.

This principle is illustrated in Garnir et al., NIM, 202(1-2), p. 187-192, 1982) which outlines the result of theoretical heating calculations according to the intensity on different substrates.

The characterisation system 1 having a good resistance to heating, it measures the signal generated by beams of particles having very high intensities. Indeed, the characterisation of the beam of particles is limited by its capacity to resist heating produced by the passage of the beam F. However, in practice, even if this limitation is overcome by the reduced thickness of the device, the integrity of the system is only ensured for beams having intensities less than 1 μA.

For this purpose, the substrate 10 can therefore be advantageously formed from a thermostable material. By "thermostable", this means that the material forming the substrate 10 can support the heat induced by the beam F of particles for a certain duration, even when the beam has a high intensity.

Preferably, the substrate 10 can be made of a thermostable polymer, i.e. that said polymer can resist a heat greater than 200° C., preferably 300° C. for a certain duration. For example, said polymer can be Kapton®, Colorless Polyimide 1® (CP1), or polyetheretherketone (PEEK). Kapton® is a polyamide having a great resistance to excess radiation and heat, available at thicknesses less than 8 μm. In addition, Kapton® does not melt. CP1 which is also a polyamide therefore has a good resistance to radiation. In addition, it is available at a thickness of 1.5 μm, lower than those at which Kapton® is available. PEEK also has a great resistance to radiation and to heat, in addition to being resistant to chemical etchings. It is advantageously available at thicknesses less than 6 μm.

Other more conventional polymers such as poly(ethylene terephthalate) (PET), e.g. Mylar®, can be used. These materials are available at very low thicknesses, for example 0.5 μm, but are difficult to manipulate at such thicknesses. Moreover, they have a low vitreous transition temperature, i.e. 70° C., i.e. that beyond this temperature, PET passes from a rubber state to a solid state and its properties change, which makes it unsuitable for a system subjected to high intensity beams.

Moreover, it is preferable that the material forming the substrate does not degas. Indeed, the degassing is a process during which a material is brought to release molecules in the form of gas. This is a process which could occur for certain materials, in particular when they are under vacuum. The materials presented below, i.e. polymers and thermostable ceramics are hardly subjected to degassing.

Also, more preferably, the substrate 10 can be made of a thermostable ceramic such as silicon nitride ($Si_3N_4$). Silicon nitride has a very large resistance to radiation and to heat and does not melt. It is decomposed at temperatures greater than 1800° C., i.e. that its properties change at this temperature. Very advantageously, silicon nitride can be formed at thicknesses of few tens of nanometres, even if it is only available for very small surfaces (<1 $cm^2$). As an example, the system 1 can comprise an emitting electrode 2 provided with a substrate 10 of 100 nm of silicon nitride covered with a pattern 20 of 50 nm of gold.

As the substrate 10 is free of any mechanical stress, this limits the damaging impact of radiation, and in particular to avoid the deterioration of the system 1 in case of exposure to beams of too high intensity. Indeed, the characterisation system 1 being situated in the vacuum line of the beam F to be measured, there is no contact force exerted by the surrounding medium on said substrate 10.

The characterisation system 1 makes it possible to measure the features of the beams of particles of very low intensities, for example 100 fA. This limitation at 100 fA is, in reality, a limitation of the measuring devices. Indeed, below 100 fA, highly sophisticated measuring means must be used in order to be able to distinguish the signal generated by the emission of electrons from the noise of the electronic devices. The characterisation system 1 therefore makes it possible to monitor beams having intensities between 100 fA and 1 μA.

Particularly advantageously, said pattern 20 is formed from a plurality of conductive segments 24 electrically insulated from one another, in particular by being positioned at a distance from one another, on the surface of the substrate. The substrate 10 is preferably electrically insulating in order to ensure that there is no conduction between the segments 24.

Preferably, each of said segments 24 is connected to an electronic means 26. There are therefore not as many electronic means 26 as segments 24. Thus, the electrons $e_r^-$, i.e. the electrons recovered following the emission of secondary electrons $e_s^-$, can be measured independently for each segment 24. Advantageously, each segment 24 therefore has a specific signal characteristic of the number of particles having passed through said segment.

Preferably, the segments 24 are situated side-by-side. In other words, said segments 24 are adjacent so as to allow a spatial sampling of the beam F. The sampling of the beam F determines the features of said beam, in particular its position, its profile and its intensity, according to the form and the relative arrangement of the segments with respect to one another.

Figure 6A:
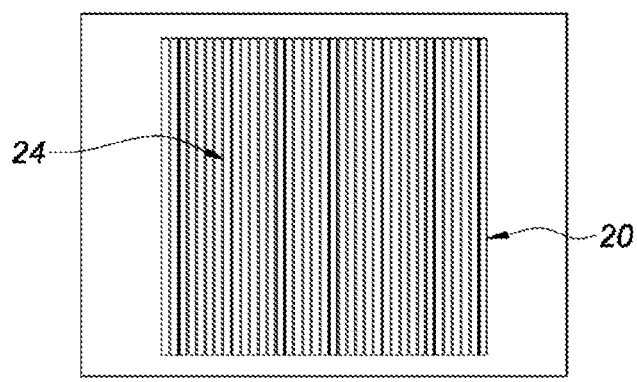
FIGS. 6a, 6b and 6c illustrate patterns according to the invention.

As is illustrated in FIG. 6a, to sample the beam F along a given axis, the segments 24 can be oriented along the same direction, of the same width and equidistant.

More specifically, the segments 24 are positioned side-by-side following in a horizontal direction, which makes it possible measure a beam F along the axis X and/or movable, being moved along the axis X (the beam F passes through the pattern 20 along the plane Z perpendicular to FIG. 6a). This is a non-limiting example and the segments 24 can be positioned in a vertical direction, along the axis Y, or any other direction.

Figure 6B:
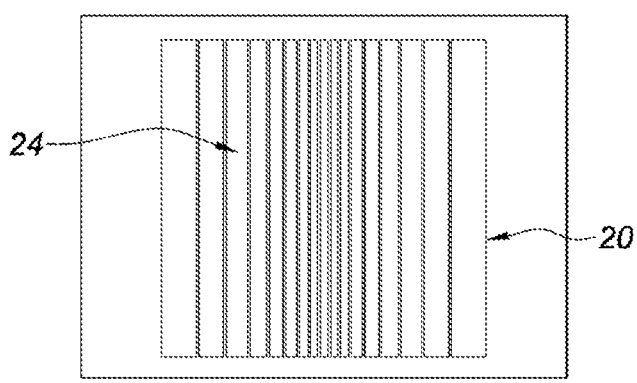

In FIG. 6b, for example, the segments 24 are of different widths (of the order of 1 to several mm). More specifically, the segments 24 situated in the centre of the pattern 20 are of width more reduced than the segments 24 situated on the edges of the pattern 20. Such a configuration measures the core of the beam F with a greater precision than the tail of the beam F and a greater sensitivity for the tail of the beam than the core, i.e. the lateral edge of the beam in comparison with its centre.

In a variant, the segments 24 can be cut into angular sectors, so as to measure the non-centring and/or the angular distribution of the beam F. Also in a variant, the segments 24 can be cut into concentric sectors, so as to measure the non-centring and/or the radial distribution of the beam F.

Figure 6C:
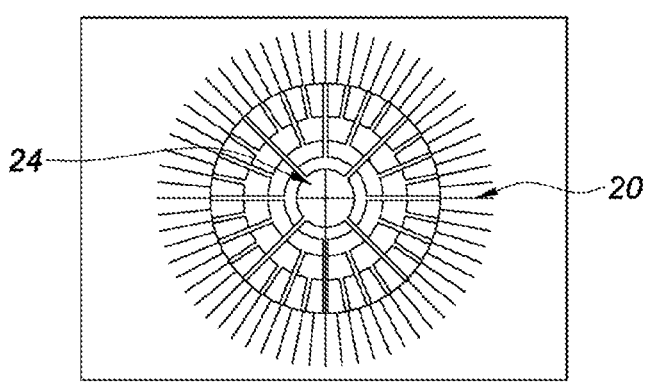

In FIG. 6c, a combination of the two examples cited above can be seen. The segments 24 are cut into angular sectors at the centre of the pattern 20 and concentric as they move away from said centre. Such an arrangement advantageously achieves an imaging of the beam F with a single emitting electrode 2.

Otherwise, it is necessary to resort to two emitting electrodes 2 each containing a pattern 20, complementary to the other pattern 20. As an example, a first electrode 2 would be dedicated to measuring the angular distribution of the beam F, while the other electrode 2 would be dedicated to measuring its radial distribution, making it possible to reconstruct the profile of the beam F. This embodiment with two electrodes is more specifically described below.

Incidentally, as the number of electrodes 2 required to obtain the imaging of the beam is reduced in the example of FIG. 6c, the quantity of material passed through is lower. A pattern 20 having such an arrangement of segments 24 is therefore particularly adapted to measuring low-energy beams which, as a reminder, only meet the criteria of low disruption and of low dispersion of the beam for very low thicknesses of passed-through material. However, the invention is not limited to such an arrangement and any other arrangement making it possible to meet the more specific needs can be considered.

Figure 7:
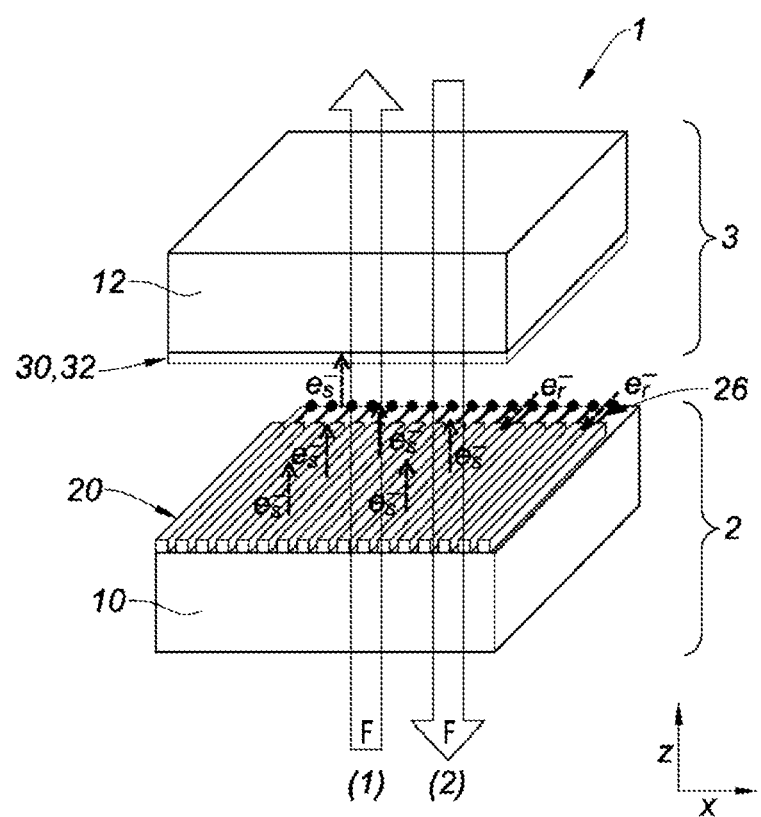
FIG. 7 illustrates schematically, in perspective, a characterisation system according to a second embodiment of the invention, the system comprises a collecting electrode. The arrow F(1) represents an emission forwards and the arrow F(2) represents an emission rearwards.

In reference to FIG. 7, the system further comprises a substantially flat collecting electrode 3 separated from the emitting electrode 2.

More specifically, said collecting electrode 3 comprises a layer of material 30 capable of being carried at a positive potential, such that a potential difference exists between said electrode 3 and the emitting electrode 2. Indeed, the collecting electrode 3 collects all or some of the secondary electrons $e_s^-$ emitted by the emitting electrode 2 (the movement of the electrons is illustrated by arrows in FIG. 7). In other words, the collecting electrode 3 ensures the looping of the current induced and therefore forms a closed circuit with the emitting electrode 2.

Preferably, for the purpose of looping the induced current, the layer of material 30 is electrically conductive, such that a surface 32 of said layer 30 is capable of collecting the incident secondary electrons $e_s^-$. Said layer of material 30 can be made of a metal or of any material alloy, allowing it to be sufficiently conductive. Like the emitting electrode 2, the collecting electrode 3 can comprise a substrate 12 ensuring the mechanical support of the layer 30.

It is not necessary that the collecting electrode 3 comprises a pattern, i.e. that the layer of material 30 forms a pattern, like the pattern 20 of the emitting electrode 2. The layer of material 30 can therefore cover the whole of the surface of the collecting electrode 3. Indeed, the collecting electrode does not have the role of imaging the position at which the secondary electrons $e_s^-$ leave the surface of the emitting electrode 2, since this function is achieved by the pattern of the invention. As mentioned above, the collecting electrode has the role of allowing the looping of the induced current and therefore forming a closed circuit with the emitting electrode 2.

Advantageously, the collecting electrode 3 can be placed opposite the emitting electrode 2, so as to facilitate collecting secondary electrons. Indeed, when they leave the surface of the emitting electrode 2, the electrons $e_s^-$ are emitted in an essentially isotropic manner. Thus, when said electrodes 2 and 3 are placed opposite one another, collecting said electrons is favoured.

Due to their mainly isotropic emission from the surface 22, it is possible that some of the secondary electrons $e_s^-$ arrive at a position which is different on the surface 32 of the collecting electrode 3.

Incidentally, in such a configuration, the largest face of the collecting electrode 3 being passed through substantially perpendicularly through the propagation axis of the beam F, it is preferable that the thickness of said electrode 3 and the thickness of the emitting electrode 2, taken in combination, do not exceed 15 µm WET, for example. Indeed, this is a process such that the characterisation system 1 satisfies the criteria of low disruption of the beam F (fraction of energy transmitted, for example, greater than 0.95) and of low dispersion of the beam F (width of the beam at 2 m less than 1 mm). In other words, according to this aim, the sum of the thicknesses of material passed through, i.e. the substrate 10 and the pattern 20, as well as the substrate 12 and the layer of material 30, must be, for example, less than 15 µm WET for a beam of proton therapy.

Figure 8A:
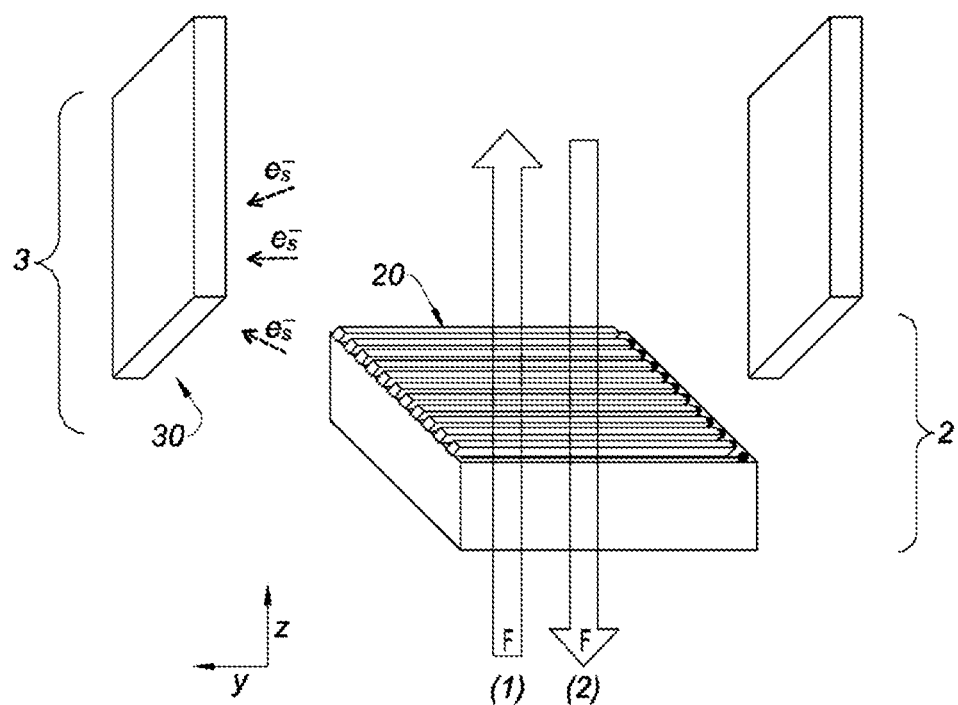
FIGS. 8a and 8b illustrate schematically, in perspective, a characterisation system according to a third embodiment of the invention with one or more collecting electrodes parallel to the axis of the beam. The arrows F(1) represent an emission forwards and the arrows F(2) represent an emission rearwards.
Figure 8B:
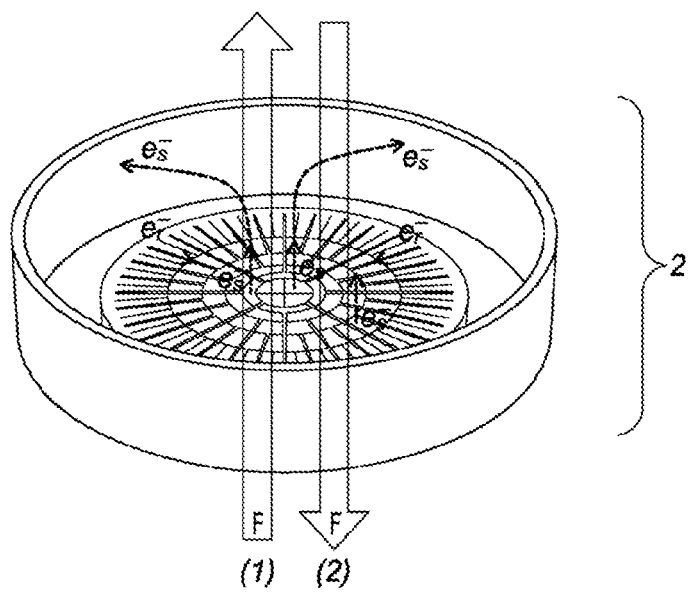

The invention, however, is not limited to such a configuration and the collecting electrode 3 can be situated outside of the propagation axis of the beam F. In this third embodiment of the invention (illustrated in FIGS. 8a and 8b), the collecting electrode 3 is not intercepting and is not subjected to the limitations of thinness. The collecting electrode 3 can, in this configuration, be formed, either of a stack comprising the substrate 12 and the conductive material 30 or advantageously of a single conductive material, for example a metal plate. The single limitation resides in the necessity to be able to install the characterisation system 1 within the line of propagation of the beam F. For example, in FIG. 8a, the collecting electrode 3 is separated into two collecting electrodes opposite one another, while in FIG. 8b, the collecting electrode 3 is continuous and of cylindrical form around a circular pattern 20.

Alternatively, to maximise the rate of collecting secondary electrons $e_s^-$ by the collecting electrode 3 and to minimise the dispersion effect of said electrons $e_s^-$, it is also possible to increase the potential applied to said collecting electrode 3. Indeed, by increasing the potential of the collecting electrode 3, the potential difference is increased between said electrode 3 and the emitting electrode 2, and consequently the attraction of the secondary electrons towards the surface 32.

Indeed, the characterisation system 1 can advantageously comprise a measuring means 4 making it possible to measure the quantity of secondary electrons $e_s^-$ emitted from the surface of the emitting electrode 2. In other words, the measuring means 4 "reads" the signal of secondary electrons $e_s^-$ emitted from the surface of the emitting electrode 2. The measuring means takes a measurement from the side of the emission, i.e. that it makes it possible to measure the signal which leaves the emitting electrode 2. Measuring the side of the emission is advantageous.

Indeed, on the one hand, with the segments 24 being electrically insulated from one another, measuring the side of the emission independently measures the signal of secondary electrons $e_s^-$ emitted from each of said conductive segments 24 individually in order to sample the beam F of charged particles.

Indeed, on the other hand, as has been mentioned above, the current collected by the collecting electrode 3 is subjected to fluctuations according to the relative position of said electrode 3 with respect to the emitting electrode 2, the potential applied to said collecting electrode 3 or the impact of residual electric and/or magnetic fields. Thus, measuring the signal on the side of the emission avoids impacts of equipment of the line of beams as well as becoming electrons emitted.

FIG. 9c illustrates schematically an electrical circuit for connecting between the segments 24 and the measuring means 4. As mentioned above, each segment 24 is connected to an electronic means 26. Preferably, this electronic means opens out onto an interfacing means which connects the electronic means 26 of the segments 24 by the measuring means 4. The measuring means 4 is adapted to measure a low intensity current, which allows it to measure the quantity of secondary electrons $e_s^-$ emitted from the surface of the emitting electrode 2. For example, the measuring means 4 can consist of a low noise electronic system. The electrical circuit is configured to allow a measuring of the current, segment-by-segment.

Figure 5C:
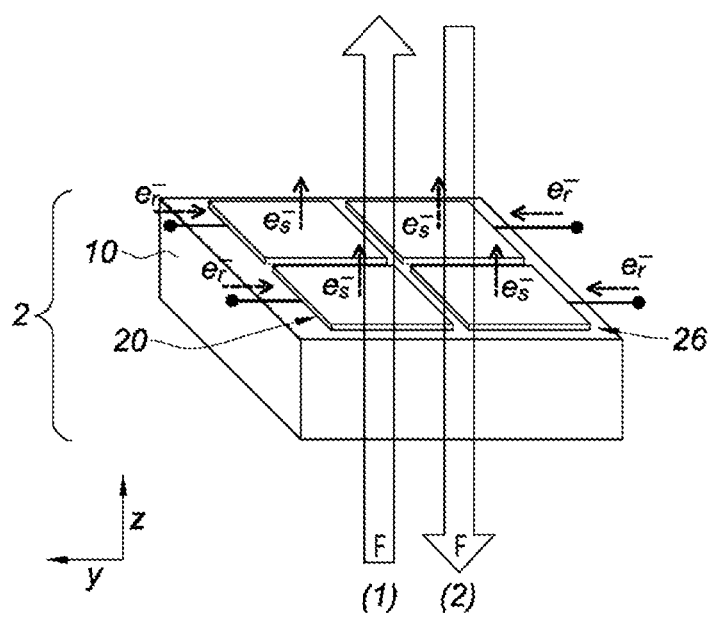

Furthermore, the use of a collecting electrode 3 is optional. Indeed, in the absence of a collecting electrode 3, the secondary electrons $e_s^-$ emitted can be left to the environment of the characterisation system 1. In this case, the electrons $e_s^-$ are absorbed by the materials surrounding said system 1. This operating method is illustrated in FIGS. 5a, 5b and 5c. The emitting electrode 2 is therefore sufficient in itself.

FIG. 9a illustrates, schematically, a characterisation system 1 according to a fourth embodiment of the invention. In this embodiment, the characterisation system 1 comprises a plurality, i.e. at least two, emitting electrodes 2 and a collecting electrode 3.

The use of several emitting electrodes 2 makes it possible, as has been seen above, to obtain complementary measures if a single pattern 20 does not make it possible to obtain all the necessary information. This also obtains redundant measures, or otherwise to refine measures. In the example illustrated in FIG. 9a, a first emitting electrode 2 is dedicated to measuring the profile of the beam F along the axis X, while the other electrode 2 measures the profile of the beam F along the axis Y.

Moreover, as also illustrated in FIG. 9a, the collecting electrode 3 can also comprise a second surface 32 opposite the first surface 32. In such a configuration, the collecting electrode 3 is positioned between two emitting electrodes 2, such that it is able to collect the secondary electrons $e_s^-$ emitted by the two emitting electrodes 2. In such a configuration, the emission is made rearwards for the emitting electrode 2 visible at the top of FIG. 9a, while the emission is made forwards for the emitting electrode 2 visible at the bottom in FIG. 9a.

However, the invention is not limited to this illustration.

The characterisation system 1 can also comprise a plurality of collecting electrodes 3 dedicated to the collection of secondary electrons emitted by several emitting electrodes 2. It is possible, but not necessary, that the number of collecting electrodes is equal to the number of emitting electrodes.

In the case of FIG. 9b, there is a first collecting electrode 3 dedicated to collecting secondary electrons emitted by a first emitting electrode 2 (visible at the top in FIG. 9b), and a second collecting electrode 3 dedicated to collecting secondary electrons from a second emitting electrode 2. In this configuration, the emission is made forwards for the emitting electrode 2 and the collecting electrode 3 visible at the top of FIG. 9b, while the emission is made rearwards for the emitting electrode 2 and the collecting electrode 3 visible at the bottom in FIG. 9a.

Furthermore, as it can also be seen in FIG. 9b, in its direction of propagation, the beam F does not necessarily pass through the substrate 10 of said electrode then the pattern 20. In other words, the beam F can also pass through the pattern 20 then the substrate 10.

However, the invention is not limited to this illustration.

For example, the system 1 can comprise three emitting electrodes 2 comprising an angular offset of 120° between the segments 24 of the first and the second electrode 2 as well as between the segments 24 of the second electrode and the third electrode 2, such that the beam F can be sampled along redundant segments and that its precision is improved.

Alternatively, the characterisation system 1 can be movable, so as to carry out translation and/or rotation movements. For this purpose, a mechanical control means can be provided to guide the system 1. Such a configuration reduces the number of emitting electrodes 2, since it is the translation and/or rotation step of the characterisation system 1 which is used to carry out the sampling.

The invention also relates to a machine for producing a beam of charged particles comprising a system 1 such as described above, said system being fixed and being permanent in the propagation line of the beam F.

For example, said machine can be a hadron therapy or proton therapy device, a particle accelerator, a machine for producing radiopharmaceutical isotopes.

Said machine can comprise systems for beam profiling upstream and downstream from a depth modulator, the assembly being arranged in a proton beam vacuum tube. In order to control the trajectory of the beam F, and in particular the channel, the particles coming from said beam, one or more magnets can be placed in the proximity of said beam. These magnets are at the origin of a magnetic field making it possible to direct the particles to a zone to be irradiated or to be treated. They do not play any role in the operation of the system for characterising the beam F.

More generally, the characterisation system 1 can be installed and/or used in any equipment for which it is useful to monitor a beam of charged particles.

Exemplary Embodiments

A system for characterising 1a beam of charged particles has been studied.

It comprises an emitting electrode 2 composed of a substrate 10 made of PEEK of 6 μm thick on which has been deposited a pattern 20 of 50 nm of gold. The pattern 20 comprises a plurality of segments 24 situated side-by-side along the axis X, having a width of 1.6 mm and separated by a distance of 0.35 mm from one another. This system also comprises a collecting electrode 3 comprising a Kapton® substrate 12 of 8 μm supporting a layer of gold 30 of 50 nm thick.

This characterisation system has been installed in a vacuum chamber situated at about 1 m downstream from the output of the line of a beam of protons of the ARRONAX cyclotron. The vacuum chamber is supported by a translation table which moves said systems in the beam F. The installation also comprises a system for reading signals, equipped with a pico-ammeter and a simplified acquisition system.

Moreover, the vacuum chamber has been equipped with two type of input windows for the beam. Thus, during the first series of measuring a window made of sapphire of 2 mm has been used (FIGS. 11a to 11c). This type of window decreases the energy from the beam, such that after their passing through, protons of 68 MeV delivered by the machine have an energy of 60 MeV on the detector, that is a decrease of 11.7%.

However, during the second series of measuring a Kapton window of 230 μm has been used. These windows decrease the beam less, even if a disruption exists. As an example, a beam of 68 MeV loses 2 MeV of energy after its passage through the window and a beam of 30 MeV loses 2.2 MeV of energy (decrease of 2.9% and 7.3%).

Measuring secondary electron rates under beam of protons.

Figure 10A:
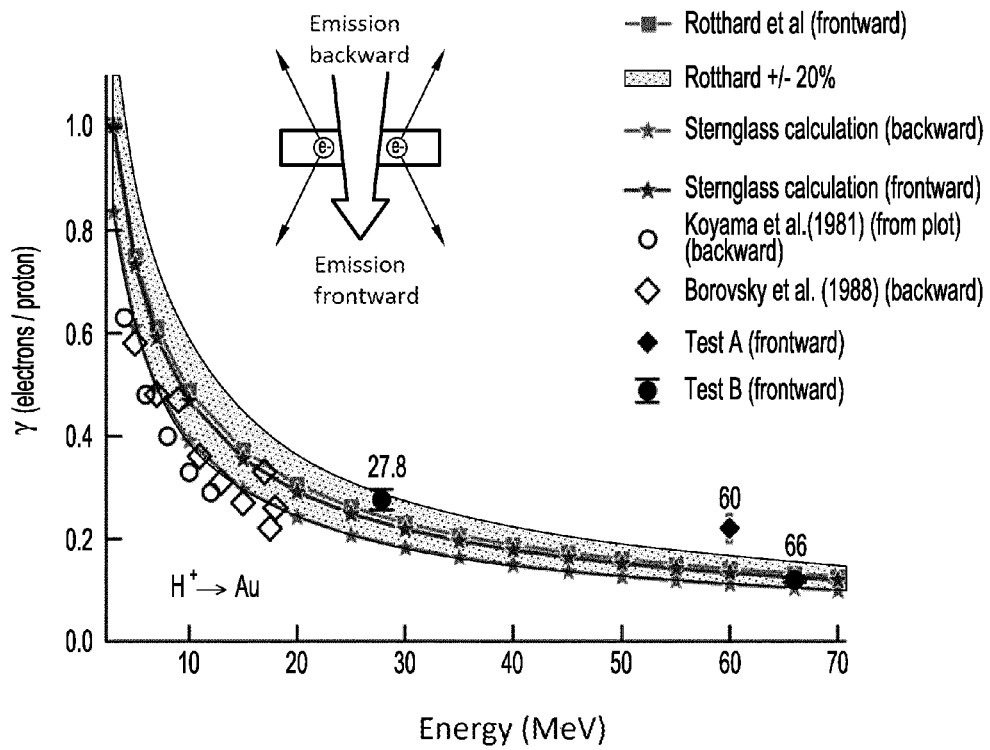
FIGS. 10a and 10b illustrate the variation of the rate of secondary electrons according to the energy of the beam (FIG. 10a) and to the intensity of the beam (FIG. 10b) according to the invention and different systems of the state of the art.

FIG. 10a shows the variations of the rate of secondary electrons measured for beams F of 27.8 MeV (Test B, solid circle), of 60 MeV (Test A, solid diamond), 66 MeV (test B, solid circle). The experimental measurements taken during this study are compared to the results obtained in the prior art.

Most of the measurements taken above relate to beams of charged particles having low or very low energies (<20 MeV). At these energies, numerous experiments have been carried out in order to study the emitting materials at the energies accessible at the time.

At the three energies tested in this study, the rate of secondary electrons is close to that expected, since the measurements taken are superimposed on the predictions made by Rotthard et al. In addition, this rate of emission is broadly sufficient to generate a signal which can be utilised, even for very beams of very low intensity.

It is useful to point out that the rate of secondary electrons varies as the loss of electronic energy per unit of length of the projectile particle (Bethe formula). Yet, the latter quantity decreases with the energy from the projectile which increases up to a minimum (termed ionisation minimum, around 2 GeV/c for protons, for example) then grows back slowly while remaining less than the loss at low energy over a broad range. Therefore, with high kinetic energy, the particle will induce a lesser emission of secondary electrons. It must however be noted that this phenomenon is compensated for at high energies by the fact that high energy beams are developed at high intensities and therefore advantageously induce more secondary electrons emitted.

Figure 10B:
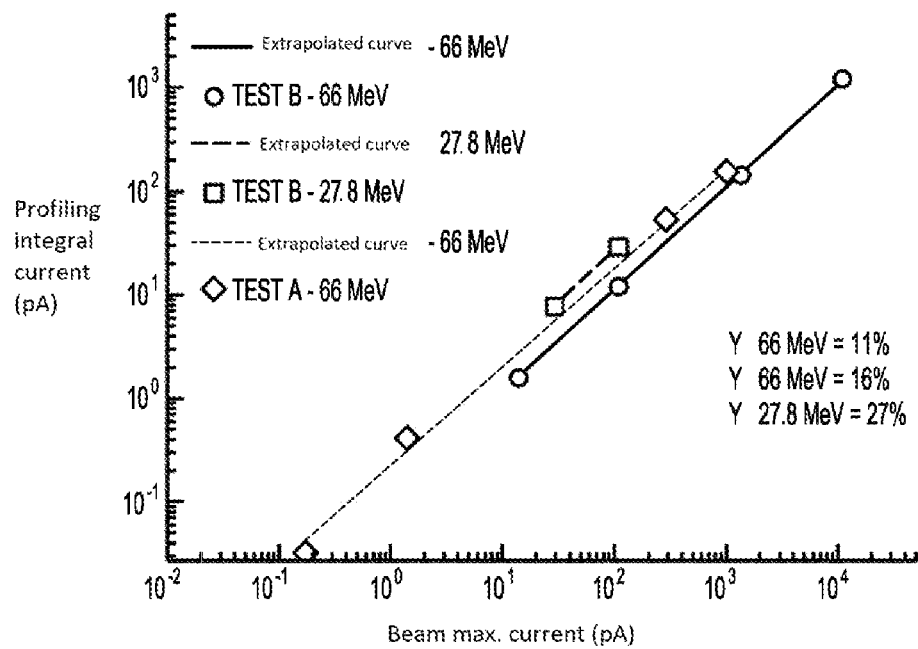

FIG. 10b illustrates the evolution of the rate of secondary electrons (in measured current) when the intensity of the beam varies between $10^{-1}$ pA and $10^4$ pA for beams F of 27.8 MeV (Test B, square), of 60 MeV (Test A, diamond), 66 MeV (Test B, circle).

The rate of secondary electrons evolves constantly according to the intensity of the beam, illustrating the linearity of the phenomenon of emitting secondary electrons. Thus, the characterisation system 1 is capable of monitoring specifically the profile of the beam through the absence of distortion of response from the monitor between the intense and low portions of the beam. Moreover, this is particularly advantageous for treating tumoral zones by proton therapy, where the application of a lateral overdose could irreversibly damage healthy tissues and affect the health of the patient.

In addition, FIG. 10b shows that the characterisation system 1 makes it possible, as provided, to measure the rate of secondary electrons for very low intensity beams, i.e. up to $2.10^{-1}$ pA for the measurement taken with the beam of 60 MeV, and very high intensity beams, up to $10^4$ pA for the measurement taken with the beam of 66 MeV. All the intermediate intensities are, of course, accessible.

Measuring the profile and the position of a beam of protons.

FIGS. 11a to 11c illustrate the evolution of the current measured according to the position of the segments 24. The protons have an energy of 60 MeV and the intensity of the beam is respectively 200 fA, 1 pA and 1 nA. The three profiles illustrated correspond to the points in the form of a diamond represented in FIG. 10b.

As illustrated in these figures, the profile of the beam F can be reconstructed according to the signal measured by the segments 24 of interest. Indeed, it is not necessary to measure the signal for each segment 24 in order to obtain a profile since the profile can be adjusted from a few points. However, the more the number of segments 24 increases, the greater the resolution of the profile is. The signal measured per segment 24 increases with the intensity of the beam. If the segment 24 situated at 15 mm is analysed, the intensity is 5 fA to 200 fA, 0.07 pA to 1 pA and 24 pA to 1 nA.

More specifically, as can be seen in FIG. 11a, the uncertainty regarding the measurement remains quite high for the very low intensity beam (200 fA). As has been specified above, for very low intensities, the noise of the measuring electronics remains a limiting factor for the characterisation system 1. In addition, as can be observed, even if the current measured per segment 24 (up to 5 fA) remains low at 200 fA, the profile of the beam can be reconstructed and the position of the beam can be estimated with a relatively small error (16.99±0.4 mm).

For beams of 1 pA (FIG. 11b) and 1 nA (FIG. 11c), the uncertainty regarding the measurement is smaller and the profile and the position of the beam can be determined with a better precision. Moreover, the position and the profile of the beam can be determined by modifying the position of the characterisation system 1 (by means of the translation table supporting the vacuum chamber) and by monitoring current variations on the same segment 24.

In addition, as can be seen in FIGS. 11a to 11c, it is also possible to give a "measurement" of the size of the beam F, from the parameter σ Indeed, this parameter σ, mainly between 3 and 3.5 mm with an error of 0.6 mm at 200 fA, 0.28 mm at 1 pA and 0.06 mm at 1 nA, represents specifically one sixth of the actual size of the beam. In other words, if sigma is equal to 3.37 mm, the size of the beam is equal to 20.22 mm. Such an example, is moreover given in FIG. 11c. The system 1 according to the invention therefore makes it possible to evaluate the profile of a beam over a large dynamic range, i.e. for beams of which the intensity can vary between a few hundred fA at 1 nA.

The invention claimed is:

1. A system for characterising a beam of charged particles, the system comprising a stack, said stack comprising:
   an ultra-thin pattern formed from an electrically conductive material;
   a thin substrate carrying said pattern;
   the stack forming an emitting electrode, said emitting electrode being capable of emitting secondary electrons in the proximity of a surface of said pattern when said emitting electrode is passed through by the beam of charged particles.

2. The characterisation system according to claim 1, wherein the stack further comprises at least one bonding layer interposed between the pattern and the substrate so as to facilitate the adhesion of said pattern on the substrate.

3. The characterisation system according to claim 1, wherein the substrate is formed from a thermostable material.

4. The characterisation system according to claim 3, wherein the thermostable material includes a polymer or a ceramic.

5. The characterisation system according to claim 1, wherein the substrate is formed from a polyamide.

6. The characterisation system according to claim 5, wherein the polyamide includes a polyetheretherketone or PET (poly(ethylene) terephthalate).

7. The characterisation system according to claim 1, wherein the thickness of the pattern is between 10 nm and 100 nm.

8. The characterisation system according to claim 1, wherein said substrate is electrically insulating and said pattern is formed from a plurality of conductive segments electrically insulated from one another.

9. The characterisation system according to claim 8, wherein said segments are made of a rustproof material.

10. The characterisation system according to claim 9, wherein the rustproof material includes gold.

11. The characterisation system according to claim 8, wherein said segments are situated side-by-side in a plane intended to extend substantially perpendicularly to the direction of propagation of the beam.

12. The characterisation system according to claim 11, wherein said segments are oriented in the same direction, of the same width and equidistant, so as to sample the beam along a given axis.

13. The characterisation system according to claim 11, wherein said segments are cut into angular sectors, so as to measure the non-centring and/or the angular distribution of the beam.

14. The characterisation system according to claim 11, wherein said segments are cut into concentric sectors, so as to measure the non-centring and/or the radial distribution of the beam.

15. The characterisation system according to claim 11, wherein said segments are cut into angular and concentric sectors so as to carry out an imaging of the beam.

16. The characterisation system according to claim 1, further comprising a collecting electrode, said collecting electrode being subjected to a positive potential, said potential being greater than the potential of the emitting electrode, so as to collect the secondary electrons emitted by said emitting electrode.

17. The characterisation system according to claim 1, comprising a measuring means, said means making it possible to measure the quantity of secondary electrons emitted from the surface of the emitting electrode.

18. A machine for producing a beam of charged particles comprising a system according to claim 1, said system being fixed and permanent.

19. A method, comprising:
   using a characterisation system according to claim 1 for treating cancerous tumours by characterising a beam of charged particles of an item of equipment.

* * * * *